Figure 1:
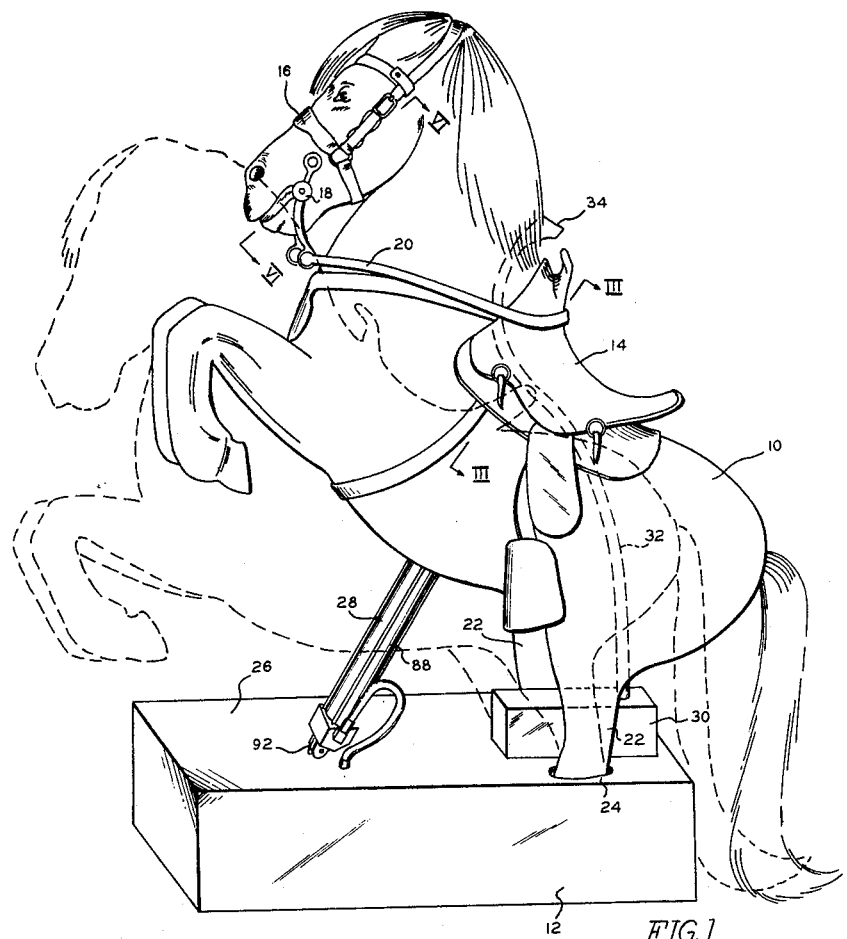

Sept. 22, 1964          C. H. KRAMM                3,149,837
                  COIN-CONTROLLED HOBBY HORSE
Filed Nov. 1, 1960                           3 Sheets-Sheet 1

INVENTOR
CARL H. KRAMM
BY Beaman & Beaman
ATTORNEY

Sept. 22, 1964     C. H. KRAMM     3,149,837
COIN-CONTROLLED HOBBY HORSE
Filed Nov. 1, 1960     3 Sheets-Sheet 2
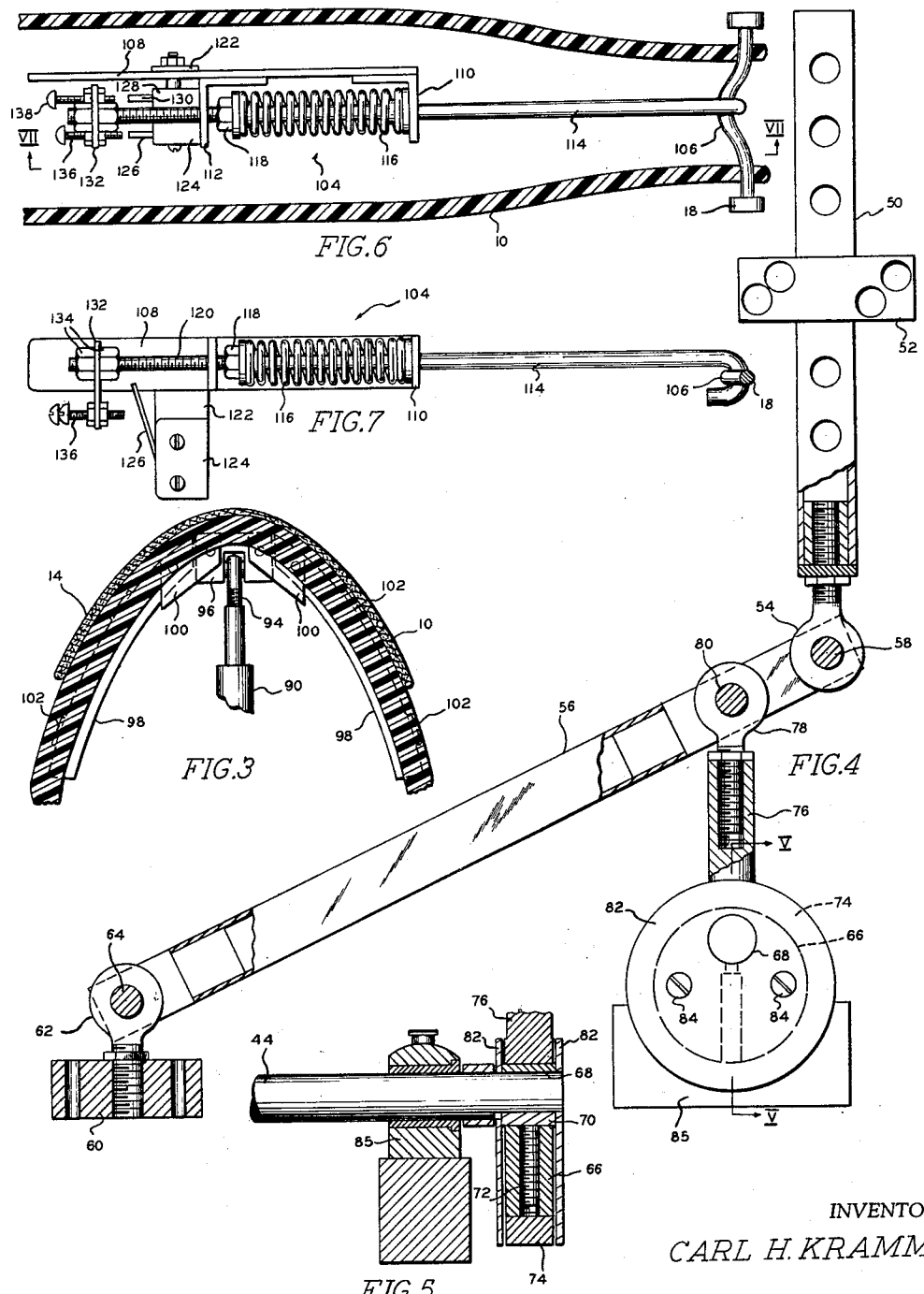
INVENTOR
CARL H. KRAMM Sept. 22, 1964     C. H. KRAMM     3,149,837
COIN-CONTROLLED HOBBY HORSE
Filed Nov. 1, 1960     3 Sheets-Sheet 3

INVENTOR
*CARL H. KRAMM*

BY *Beaman & Beaman*
ATTORNEY

United States Patent Office 3,149,837
Patented Sept. 22, 1964

1

3,149,837
COIN-CONTROLLED HOBBY HORSE
Carl H. Kramm, 3747 E. Coon Lake Road,
Howell, Mich.
Filed Nov. 1, 1960, Ser. No. 66,551
10 Claims. (Cl. 272—53.1)

The invention pertains to mechanical, power-operated, amusement devices and particularly relates to occupant-supporting amusement devices which are coin-operated.

Individual riding, coin-operated, amusement devices have enjoyed considerable commercial success in retail stores, amusement parks, shopping centers, and other areas wherein children are present. The amusement device with which the invention is concerned pertains to the type which usually takes the form of a horse wherein the child may mount the saddle of the horse and upon the insertion of the coin into the actuating switch, the horse will begin a rocking motion which simulates that of the gait of a real horse. Similar devices have also been employed wherein, instead of a horse, the device occupied by the child is in the form of an airplane, space ship or automobile and the power mechanism imparts a vibration, rocking or other movement which results in a cyclic motion of the occupied structure. While the concepts of the invention may be applied to other apparatus than a horse-like structure, the advantages and principles of the invention are well utilized with power-operated horse devices and the disclosure will be limited to this type of embodiment.

The usual construction of apparatus of the above type employs a base in which an electric motor and other attendant mechanism are housed and the horse member is mounted upon the base structure. Cam or eccentric means are usually employed within the base to impart a vertical oscillation to the horse structure at the point of connection to the base and in some embodiments, the motions imparted to the horse may cause the horse to slightly rock from side-to-side, as well as oscillate in a vertical direction. As this type of amusement device imparts only a regular cyclic motion to the horse, which is of a rather gentle character, the appeal of the device is limited to small children and it is a purpose of the invention to produce a mechanical coin-operated horse which is capable of an action which will appeal to a wider age span of customer.

To enlarge the appeal of this type of power-operated amusement device, the invention contemplates a mechanical horse which, in addition to a cyclic vertical oscillation, the horse is capable of "rearing" with respect to the base, such that the front portion of the horse will vertically rise with relation to the rear legs thereof. The rear legs of the horse are attached to the base and the control of the "rearing" is under the control of the operator through the reins of the horse's bridle. To add challenge to the operation of the device, it is contemplated to use control structure which is responsive to a predetermined tension upon the reins such that rearing will only occur upon the rider achieving the predetermined rein control and a rein tension above or below a given value will cause the horse to cease rearing and move downwardly about the rear legs.

It is, therefore, an object of the invention to provide a coin-operated, power-actuated, riding, amusement device which is capable of two distinct movements, one of the movements being under the control of the occupant.

A further object of the invention is to provide a power-actuated amusement device having two distinct movements wherein the actuation of the movements may be selectively controlled by the sequential insertion of coins.

Yet another object of the invention is to provide a mechanical horse amusement device which is capable of "rearing" under the control of the seated occupant and wherein such rearing occurs upon producing a predetermined tension within the reins of the horse's bridle.

Another object of the invention is to provide a coin-operated, self-contained, amusement device employing hydraulic system components wherein the components are concisely arranged within the base of the amusement device and are located as to minimize problems arising from leakage.

Another object of the invention is to provide a coin-operated mechanical horse amusement device which is capable of rearing due to the extension of a supporting hydraulic, extensible, motor and wherein control of the extension of the motor is electrically operated through novel switch means mounted within the horse's head and actuated by the horse's reins.

A further object of the invention is to provide a mechanical horse amusement device employing a molded horse body wherein means are provided for molding mounting structure directly into the body material.

Figure 2:
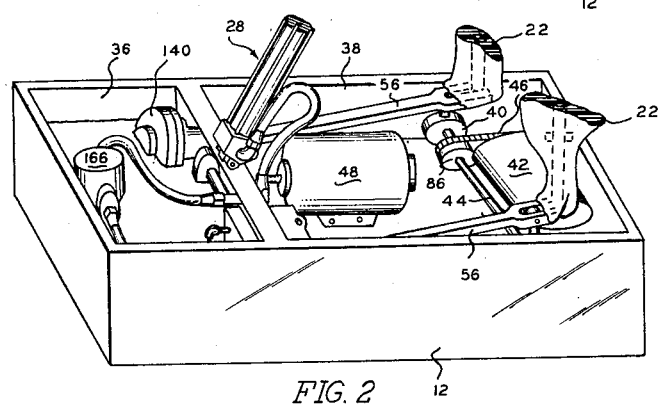
Figure 8:
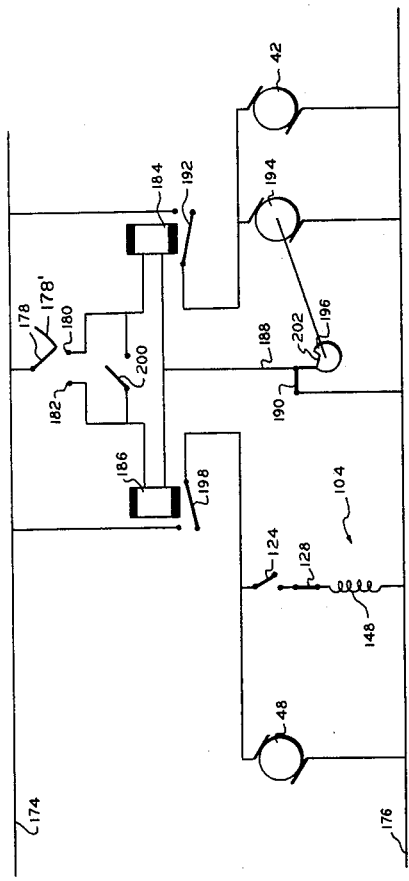
Figure 10:
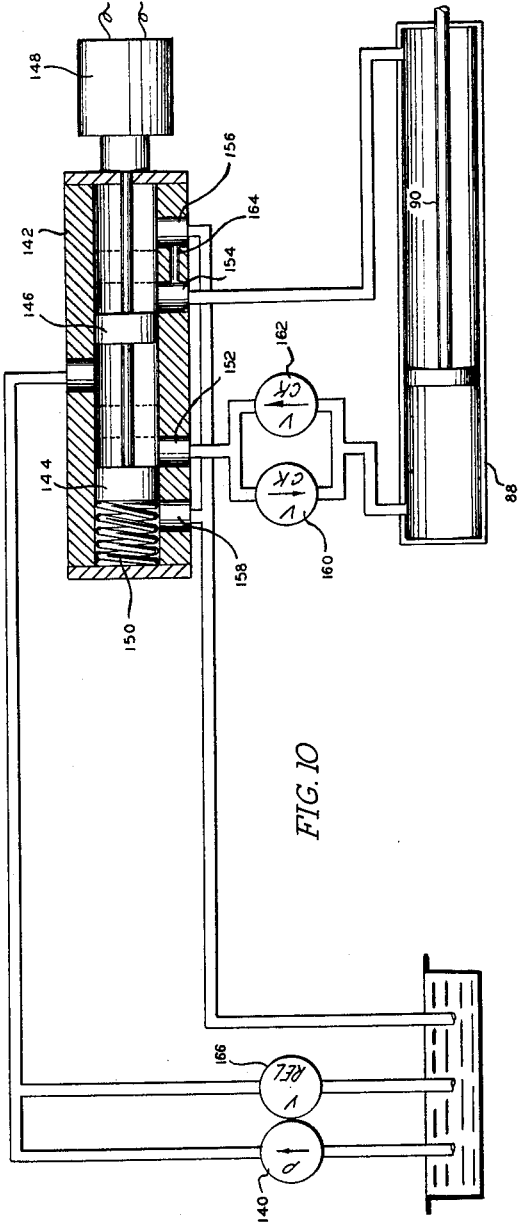
Figure 9:
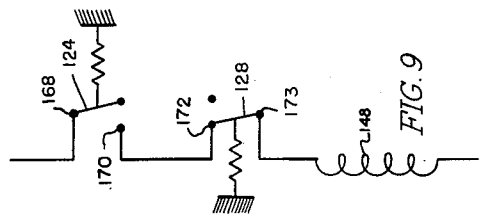

These and other objects of the invention arising from the arrangement of the relationship of the components of an embodiment thereof will be apparent from the following description and accompanying drawings, wherein:

FIG. 1 is an elevational perspective view of a mechanical horse amusement device in accord with the invention, showing the horse in the "rearing" position in full lines and in a lower position in dotted lines, FIG. 2 is a perspective view of the structure within the base of the apparatus with the cover removed and the associated superstructure partially shown, FIG. 3 is a sectional elevational detail view of the horse body taken through a transverse plane adjacent the mounting structure for the top of the piston, FIG. 4 is an elevational view, partly in section, of the rear leg and linkage elements as assocaited with eccentric means for imparting vertical oscillation to the rear legs, FIG. 5 is an elevational sectional view of the eccentric structure taken along section V—V of FIG. 4, FIG. 6 is a plan elevational view taken through the head of the horse along section VI—VI of FIG. 1, illustrating the electric switch structure therein, FIG. 7 is an elevational view of the electric switch control structure of FIG. 6 taken along section VII—VII thereof, FIG. 8 is an electrical diagram of the circuit employed by the invention, FIG. 9 is a detail of the actual circuit of the switch of FIG. 6, and FIG. 10 is a diagrammatic view of the hydraulic system employed by the invention.

The relation of the basic components of an amusement device in accord with the invention may be best appreciated from FIG. 1 wherein a molded horse-shaped occupant-supporting structure 10 is shown mounted upon a substantially rectangular base member 12. The horse body 10 is preferably molded of synthetic material and is provided with the typical leather riding tackle, including a saddle 14 and a bridle 16. A bit 18 is associated with the mouth of the horse and reins 20 are affixed to the bit whereby a pull on the reins will cause the bit to rotate within the horse's mouth. The rear legs 22 of the horse extend into openings 24 formed in the cover 26 of the base 12 and into the base itself, as will be later apparent. An expansible motor unit 28 is pivotally mounted at its lower end to the base and extends up into the body of the horse through an opening in the underside thereof and is affixed to the body below the saddle 14, FIG. 3. The horse body is hollow throughout and, thus, space therein is provided for the upper end of motor 28 and the other structure mounted within the body. A switch box 30 may be affixed to the cover of the box below the horse for housing the coin-operated switches which activate the mechanism of the apparatus and a flexible coin chute 32, having a slot at its upper end 34 for coins, may extend through the horse's body for transmitting the coin to the switch box 30. It will be understood that other arrangements for the switch box and coin-inserting means may be employed and the illustrated embodiment is only one possible arrangement.

The base 12, FIG. 2, preferably consists of a rectangular container having a removable cover 26 and the base is divided into compartments 36 and 38. The compartment 36 serves as a fluid reservoir and the compartment 38, the rear portion of the base, houses the electric motors and rear leg oscillation means. The rear legs 22 of the horse body are mounted upon lever structure which may be raised and lowered by eccentrics 40 and the eccentrics 40 are operatively driven from an electric motor 42 rotating the shaft 44 by means of a chain 46. The structure of the leg-supporting linkages will be more fully explained hereinafter.

The compartment 36 of the base which serves as a fluid reservoir preferably contains most of the components necessary to the fluid system employed with the invention and serves as the housing for the pump, pressure relief valve, check valves, flow control valves and most of the piping necessary with these components. The electric motor 48, mounted within the base portion 38, drives the pump through suitable transmission and sealing means. The advantage of locating most of the hydraulic components within the reservoir results from the ability of the reservoir to catch any fluid leaking from these components and, hence, the possibility of fluid escaping from the components mounted within the base soiling the floor about the base is prevented. Such an advantage is of significance with this type of device wherein very little maintenance takes place.

The lever and linkage structure supporting the rear legs of the horse body is identical for each leg and is best illustrated in FIGS. 4 and 5. Each of the legs is provided with an insert 50 molded into the material of the leg and this insert is provided with a plurality of holes and a cross member 52 to permit the molded body material to intimately interlock with the insert that the insert and horse body may become, in effect, an integral unit. The lower end of the inserts 50 are provided with a pivot bearing 54, which is threadedly affixed to the insert for adjustable positioning thereto. The bearing 54 is pivotally affixed to the lever 56 by means of a pivot pin 58 and the other end of the lever 56 is pivotally mounted to a bracket 60 affixed to the bottom of the base portion 38, and a pivot eye 62 and pivot pin 64 affix the lever to the bracket. As will be apparent from FIG. 2, the ends of the linkage levers 56 are formed with yokes wherein the bearings 54 and 62 may be located intermediate the arms of the yokes.

The linkage levers 56 vertically oscillate about the pivots 64 to impart a rhythmical motion to the horse body and this motion is transmitted to the levers by means of eccentrics 40 located below each of the levers 56. The eccentric includes a cylindrical disc 66 having a bore 68 eccentrically related to the axis of the disc and bore 68 is provided with a keyway receiving a key 70 whereby the disc may be secured to the shaft 44 in eccentric relation thereto. A set screw 72, extending through the disc 66, engages the key 70 holding the same in position. A crank member, having a cylindrical portion 74, encompasses the disc 66 in slidable relation thereto and a radially extending portion 76 transmits the eccentric motion of the disc 66 to the levers 56 through a bearing 78 and pivot pin 80. The bearing 78 is adjustably positionable within the crank portion 76 and extends into the yoke portion of the upper ends of the levers. The crank portion 74 is maintained upon the disc 66 by a pair of cylindrical guide plates 82 located on opposite sides of the disc and of a diameter greater than the disc. The plates 82 may be held in position by a pair of screws 84 extending through the disc 66. A pair of bearing supports 85, one of which is shown in FIG. 5, are affixed to the bottom of the base portion 38 to rotatably support the shaft 44. As shown in FIG. 2, the shaft 44 is rotated by the electric motor 42, through gear reduction means mounted upon the motor housing, and chain 46 through a sprocket 86 mounted upon the shaft. Thus, upon energizing the motor 42, the shaft 44 will rotate and vertically oscillate the rear legs of the horse body 10. The eccentric discs 66 are preferably identically arranged with respect to the angular relation to the shaft such that both rear legs will rise and fall in unison, however, one of the discs may be slightly angularly related to the other if a slight "rocking" in the lateral direction is desired.

The expansible motor unit 28 consisting of a cylinder 88 and piston assembly 90, see FIG. 10, is pivotally mounted at 92 upon the base 12 and the piston is mounted to the horse body, below the saddle region, as shown in FIG. 3. The upper end of the piston assembly 90 is provided with a bearing member 94 which may be axially adjusted with respect to the piston and is pivotally associated with the bearing member 96 which is molded into the horse body. In that considerable force will be imposed upon the horse body through the piston, the bearing member 96 distributes the force through a considerable extent of the body by means of a pair of arcuate elements 98 extending down the lateral sides of the horse body which are affixed at their upper end to the member 96 through connecting web members 100. The arcuate members 98 are molded into the material of the body 10 and are provided with cross pieces 102 welded thereto such that considerable bonding exists between these members and the body and, hence, the force exerted upon the bearing member 96 through the piston is well distributed.

As mentioned above, the control of the hydraulic motor 28 is accomplished through the reins 20 and to this end an electric switch assembly 104 is located within the hollow confines of the head portion of the body and the switch is operatively associated with the bit 18 which is rotatably mounted in the horse's head. This construction will be appreciated from FIGS. 6 and 7 wherein the shape of the bit is similar to that of an actual horse bit having a portion 106 deflected from the axis of rotation of the bit. The switch assembly consists of a support plate 108 which is affixed by suitable fastening means, not shown, within the horse's head. A pair of plates 110 and 112 are attached to the plate 108 and extend at right angles thereto. The plates 110 and 112 are provided with aligned holes such that a rod 114 may extend therethrough and be slidably received therein. The lower end of the rod 114 is hooked, FIG. 7, about the offset bit portion 106 and is maintained in engagement with this offset portion by means of a compression spring 116 interposed between the plate 110 and a nut and washer assembly 118 mounted upon the threaded portion 120 of rod 114. Thus, the rod 114 will be continually biased to the left, FIG. 6, maintaining the bit in the illustrated relationship. A pair of electric switches of the type commonly known as "micro" switches are affixed to the underside of the plate 108 upon a support element 122 affixed to the plate and extending below. The switch 124 is provided with an actuating arm 126 and the switch 128 is operated by the arm 130. A screw-supporting plate 132 is adjustably affixed adjacent the outer end of the rod 114 by a pair of nuts 134. The plate 132 supports a pair of screws 136 and 138 which operatively associate with the switch arms 126 and 130, respectively.

In operation, a tension or pull on the reins will cause the bit 18 to rotate and, due to the camming action of the offset portion 106, the rod 114 will be moved to the right, FIGS. 6 and 7. The screws 136 and 138 are positioned such that movement of the rod 114 to the right will cause the screw 136 to engage the switch arm 126 and actuate the switch to cause the horse to rear by means as will be later described. Continued movement of the rod 114 in the same direction causes the screw 138 to operatively engage the switch arm 130 which will depressurize the motor unit 28 and cause the horse to lower. It will be understood that the screws 136 and 138 are so positioned, and the arms 126 and 130 are capable of enough movement, that slight axial translation of the rod 114 to the right after actuation of the switch 124 is permitted before the switch 128 is actuated to prevent the control of the "rearing" to be oversensitive. Thus, it will be appreciated that a predetermined tension is required upon the reins 20 to energize only the switch 124 to cause "rearing" of the horse. The tension required to cause rearing may be adjusted by selectively locating the nut 118 upon the rod 114.

The hydraulic systeming employed by the invention will be apparent from FIG. 10. The pump 140 is driven by the electric motor 48 and provides pressurized fluid to the solenoid-operated four-way valve 142. The valve 142 includes an axially positionable stem having a pair of spools 144 and 146 thereon which may be moved to the full line position by energizing solenoid 148 and upon de-energizing the solenoid the spring 150 will locate the spools in the dotted line positions. Ports 152, 154, 156 and 158 are formed in the valve body and are provided with associated conduits. The port 152 communicates with a pair of combination flow control and check valves 160 and 162 which are connected in parallel to the cylinder 88 on the lower side of the piston assembly 90. The port 154 communicates with the cylinder 88 on the opposite side of the piston assembly 90 and the ports 156 and 158 are in communication with the reservoir 36. It will be noted that a bypass passage 164 in the valve body establishes communication between the ports 154 and 156. A pressure relief valve 166 is employed to prevent excessive pressure from building up in the system.

Referring to FIG. 9, one type of switch arrangement for the switches 124 and 128 is illustrated. Switch 124 is of the "normally open" type establishing a circuit between terminals 168 and 170 only upon the switch being actuated by its actuating arm 126. Switch 128 is of the "normally closed" type normally establishing a circuit between terminals 172 and 173, which will be disrupted upon actuation of the switch by actuating the arm 130. Switches 124 and 128 are shown in FIG. 9 in their "normal" positions. By wiring the switches, as illustrated in FIG. 9, wherein the switches are in a series relationship to control energization of the coil of the solenoid 148 operating the valve 142, actuation of the switch 124 will connect terminals 168 and 170 to energize the coil but a subsequent actuation of the switch 128 will disconnect the terminals 172 and 173 and thus open the circuit and de-energize the coil. Thus, it will be appreciated that as the rein tension is varied and the rod 114 is moved back and forth between the positions which will activate the switches 124 and 128 the valve 142 will be operated in dependence upon the rein tension.

The electric circuitry which may be employed with the invention is illustrated in FIG. 8 and includes the primary power conductors 174 and 176 having a 110 volt differential. A coin operated switch 178, having a first contact 180 and a second contact 182, is connected to the line 174 and the contact 180 is connected to the relay 184 and contact 182 controls relay 186. The relays are connected to the line 176 through conductor 188 and the normally closed timer switch 190. Relay 184 operates the switch 192 which controls energization of a timer motor 194 and the eccentric drive motor 42. The timer motor 194 rotates a timer disc 196 having a notch in the periphery thereof.

The relay 186 controls a switch 198 which in turn controls the pump motor 48 and energizes the circuit of the switch assembly 104.

The coin-operated switch 178 may be of any conventional construction wherein the insertion of a first coin will energize the contact 180 and the insertion of a second coin will close contact 182 while also maintaining contact 180 energized. For this purpose switch 178 includes the portion 178'. A switch 200 is also provided between contacts 180 and 182 for a purpose described later.

The operation of the amusement apparatus of the invention is as follows. With the switch 178 in the open position, the insertion of a coin into the coin chute 32 will close the switch and energize the contact 180 which energizes the relay 184 closing switch 192 which will energize the motor 42 to rotate the shaft 44 and impart gentle rocking motion to the horse body through the eccentric and lever arrangements as described above. Simultaneously, timer motor 194 will begin to slowly rotate disc 196 clockwise. Upon the insertion of a second coin into the coin chute 32 to cause further movement of switch 178, the contact 182 will also be energized which closes switch 198 and energizes the electric motor 48 operating the hydraulic pump 140. Upon energizing of the pump motor circuit, the rein control switch assembly 104 to control "rearing" will become effective and upon the rider pulling upon the reins with sufficient tension which will actuate the switch 124 to energize the associated terminal 170 but will not actuate the switch 128, the solenoid 148 will shift the valve spool stem to the solid line position of FIG. 10, causing the piston assembly 90 to be moved in the direction to the right, FIG. 10, which causes the horse body 10 to rise about the pivots 58 of the rear legs. Should the operator decrease the rein tension to the point where the screw 136 controlling the switch arm 126 would cause the switch 124 to actuate to de-energize terminal 170 or increase the tension to the point where the screw 138 would engage the switch arm 130 to actuate switch 128 to break the circuit through switch 128 and de-energize terminal 173 thereof, the solenoid 148 will be de-energized and the spring 150 will shift the valve spools 144 and 146 to the dotted line position of FIG. 10. With the solenoid 148 de-energized, the pressurized fluid will flow through port 154 into the upper portion of the cylinder 88 and simultaneously flow through the passageway 164 into the reservoir 36. As the horse moves in the downward direction due to the weight of the rider and horse and the small fluid pressure within the upper part of the piston, the fluid within the lower portion of the cylinder will flow through the check valve 162 and the ports 152 and 158 to the reservoir. When the solenoid 148 is energized, the pressurized fluid flows through the port 152 and the valve 160 and the fluid exhausted from the upper part of the cylinder flows through the ports 154 and 156 back to the reservoir. By adjusting the throttle valves 160 and 162 the velocity of angular movement of the horse, both in the upward and downward directions may be controlled.

The energized motors will continue to operate until the switch 190, which has a feeler arm riding upon the periphery of the timer disc 196, is opened as the feeler arm drops into the notch 202 on the disc periphery. Upon opening of switch 190 both relays will be de-energized and all of the motors will cease to operate. A mechanical or electrical linkage may be interposed between switch 192 and 178 which will open switch 178 upon de-energization of relay 184 and timer motor 194 has sufficient inertia to rotate disc 196 to again close switch 190. The apparatus is now ready for another rider. It will be understood that many variations in the circuitry are possible to produce an operation equivalent to that described above and the particular circuit employed will depend largely upon the type of components available.

It is not necessary that the upper portion of the fluid cylinder be in communication with the fluid as illustrated, however, by employing the disclosed system, lubrication of the piston rod as it passes through the seal of the cylinder will be insured and any leakage past the piston of the pressurized fluid therebelow will flow back into the reservoir rather than down onto the base 12. Thus, the opportunities of objectionable leaks occurring are minimized.

It is contemplated that the owners of some of the amusement apparatus in accord with the invention will desire that both the cyclic oscillation and the rearing action be energized by a single coin and, hence, the closing of the switch 200 can accomplish this function by operating relays 184 and 186 from contact 180 simultaneously.

It will, therefore, be appreciated that the invention produces an amusement device which will appeal to a wide age span of customer and that considerable skill may be required to cause the horse to rear to its uppermost position. The skill required to maintain the proper tension upon the reins to cause rearing of the horse is considerable in that as the horse rises the tendency of the rider is to pull back upon the reins to gain his balance and this action will increase the rein tension and depressurize the expansible motor 28 and by regulating the screws 136 and 138, the sensitivity of the rein control may be varied.

While the invention is disclosed as being used with a horse-type amusement device, it is contemplated that the invention may find application with similar devices which may be in the form of a space ship or airplane utilizing a control wheel or stick to cause the occupant-containing portion to tilt upwardly and downwardly. As similar or other modifications may be apparent to those skilled in the art within the spirit and scope of the invention, it is intended that the invention be defined only by the scope of the following claims.

I claim:

1. A coin operated mechanical amusement device comprising, in combination, a base, an occupant-supporting member pivotally mounted upon said base for movement in a vertical plane, first motive means interposed between said member and base spaced from the pivot connection therebetween selectively pivotally positioning said member relative to said base, first occupant actuated control means controlling operation of said motive means, second motive means vertically oscillating the pivot connection between said member and base, second control means activating said second motive means, first coin-operated electric switch means activating said second control means, second coin-operated electric switch means activating said first control means permitting control thereof by the occupant, and third switch means interconnecting said first and second control means whereby said first and second control means may be individually energized by separate coins or simultaneously energized by a single coin.

2. A mechanical rearing horse amusement device comprising, in combination, a base, a horse-shaped occupant-supporting member having front and rear portions, pivot mounting means pivotally mounting the rear portion of said member to said base whereby said horse member may pivot in a vertical plane relative to said base, an extensible motive means interposed between said base and said member at a point removed from said pivot mounting means, control means regulating the extension of said motive means, rein-like members, means operatively associating said rein-like members with said control means and responsive to a predetermined tension on said rein-like members to actuate said motive means to selectively determine the angular position of said horse member relative to said base simulating rearing.

3. A mechanical rearing horse amusement device comprising, in combination, a base, a horse-shaped occupant-supporting member including a head, body and a pair of downwardly extending rear legs, pivot means affixing said rear legs to said base, a hydraulic extensible motor interposed between said base and body, a fluid reservoir, a pump, an electric pump motor within said base in operative relation with said pump, a valve interconnecting said pump and extensible motor controlling the extension thereof, conduit means connecting said pump and reservoir, valve control means within the head of said horse-shaped member, and occupant operated rein means actuating said valve control means whereby the occupant controls vertical pivoting of the horse member relative to said base.

4. In a mechanical horse amusement device as in claim 3 wherein said valve control means includes control elements actuating said valve to pressurize said extensible motor and raise said horse member upon a predetermined tension being exerted upon said rein means, said control elements depressurizing said extensible motor at rein tensions less and greater than said predetermined tension.

5. In a mechanical horse amusement device as in claim 4 wherein a solenoid is operatively associated with said valve and said valve control means comprises an electric switch operatively controlling said solenoid, said switch including spring means biasing said control elements toward a position rendering said extensible motor depressurized, said control elements having contact means activating said solenoid and valve to pressurize said extensible motor upon said predetermined tension compressing said spring a predetermined degree, and contact means rendering said solenoid and valve operative to depressurize said extensible motor upon compression of said spring greater than said predetermined degree.

6. A mechanical rearing horse amusement device comprising, in combination, a base, a horse-shaped occupant-supporting member including a head, body and a pair of downwardly extending rear legs, a pair of levers pivotally mounted at one end to said base, means pivotally connecting each of said rear legs to the other end of each one of said levers, a hydraulic cylinder and piston unit interposed between said base and body, a fluid reservoir within said base, a pump within said reservoir, a pump motor within said base operatively connected to said pump, a solenoid-operated valve within said base controlling the fluid flow from said pump to said unit and from said unit to said reservoir, electric switch means within said head operatively connected with the solenoid of said valve, rein means tensioned by the occupant actuating said electric switch means to selectively pressurize said unit causing the horse member to raise and lower, a rotatable shaft within said base, eccentrics mounted on said shaft operatively connected to said levers, electric motor means within said base rotating said shaft and eccentrics vertically oscillating said levers, and motor switch means activating said pump motor and shaft rotating motor.

7. In a mechanical rearing horse amusement device as in claim 6 wherein said electric switch includes a linearly movable control element operatively connected to and movable in a first direction by said rein means, a spring biasing said element in a second direction opposite said first direction tending to pull the rein means away from the occupant, contact means operated by said element upon compression of said spring and movement of said element a predetermined degree in said first direction activating said solenoid to pressurize said unit and raise said horse member, and means operated by said element deactivating said solenoid to depressurize said unit upon said element moving in said first direction beyond said predetermined degree causing said horse member to lower.

8. A mechanical amusement device comprising, in combination, a base, an occupant-supporting member pivotally mounted upon said base for pivotal movement in a vertical plane, selectively operable, extensible motive means interposed between said base and member spaced from the pivot connection therebetween selectively pivotally positioning said member relative to said base, oscillation means mounted in said base vertically oscillating the pivot connection between said member and base, occupant-actuated control means controlling said motive means, said control means including an occupant-controlled control element sequentially movable between first, second, and third positions, said first and third positions rendering said motive means inactive and said second position activating said motive means pivotally raising said member relative to said base, and means biasing said control element toward said first position.

9. A mechanical amusement device comprising, in combination, an elongated occupant-supporting member having spaced front and rear end portions, a base, pivot means pivotally mounting said rear end portion upon said base permitting movement of said front end portion in a vertical direction thereto, motive means interposed between said base and occupant-supporting member adapted to raise and control lowering of said front end portion relative to said base, occupant-actuated control means controlling said motive means selectively regulating raising and lowering of said front end portion relative to said base, and means biasing said control means toward a position rendering said motive means inactive, whereby the occupant must overcome said biasing means to activate said motive means, said control means including means rendering said motive means inactive upon the occupant excessively overcoming the force exerted upon said control means by said biasing means.

10. A mechanical amusement device comprising, in combination, an elongated occupant-supporting member having spaced front and rear end portions, a base, pivot means pivotally mounting said rear end portion upon said base permitting movement of said front end portion in a vertical direction thereto, motive means interposed between said base and occupant-supporting member adapted to raise and control lowering of said front end portion relative to said base, occupant-actuated control means controlling said motive means selectively regulating raising and lowering of said front end portion relative to said base, said control means including a movable occupant-actuated control element, spring means biasing said element toward a position deactivating said motive means, said control means including first and second series connected control members sequentially operated by said element upon movement of said element against the spring force whereby upon the occupant overcoming the spring force to produce a predetermined movement of said element said first control member is actuated to activate said motive means and movement of said element beyond said predetermined movement against the spring force deactivates said motive means.

References Cited in the file of this patent

UNITED STATES PATENTS

| | | |
|---|---|---|
| 2,634,975 | Hahs | Apr. 14, 1953 |
| 2,801,104 | Yetter | July 30, 1957 |
| 2,889,148 | Lyles | June 2, 1959 |